Aug. 18, 1970 S. X. SHORE 3,524,273

ANIMATED MEASURING TAPE

Filed Dec. 5, 1967

United States Patent Office 3,524,273
Patented Aug. 18, 1970

3,524,273
ANIMATED MEASURING TAPE

Sidney X. Shore, 29 Wren Drive,
Roslyn, N.Y. 11576

Filed Dec. 5, 1967, Ser. No. 688,163
Int. Cl. G09f *11/04*
U.S. Cl. 40—70 12 Claims

ABSTRACT OF THE DISCLOSURE

A measuring tape and a rewind spring are joined as a convoluted winding in a container having a transparent side wall. A display disc is disposed between the convoluted winding and the transparent side wall. The disc spins due to lateral contact with the convoluted winding when the tape is pulled out and when it is rewound. After spinning, the disc comes to rest in a random position. Artwork on the spinning disc provides animated effects, especially where there are markings on both the disc and the wall of the container.

The present invention relates to devices especially suitable for distribution as advertising specialities, combining a measuring tape and an animated display.

An object of the invention is to add interest to conventional spring-rewound tape measures, and, more particularly, an object of the invention resides in providing a novel wind-up tape measure with an animated display.

The illustrative embodiment of the invention described below includes a spring-retracted measuring tape in a container having a transparent wall at one side of the tape-and-spring winding. A display disc is rotatably confined between the winding and transparent wall, and the disc is frictionally induced to rotate during the unwinding and rewind operations of the tape. Artwork such as designs or inscriptions or both on the disc create interesting animated effects while the tape is being unwound and rewound. The effects can be varied further by providing related artwork on the disc and the transparent wall.

The nature of the invention, including the foregoing and other objects and novel features, will be better appreciated from the detailed description that follows of the presently preferred embodiment of the invention, and two modifications which are shown in the accompanying drawings forming part of the disclosure.

Figures 1, 2, 3:
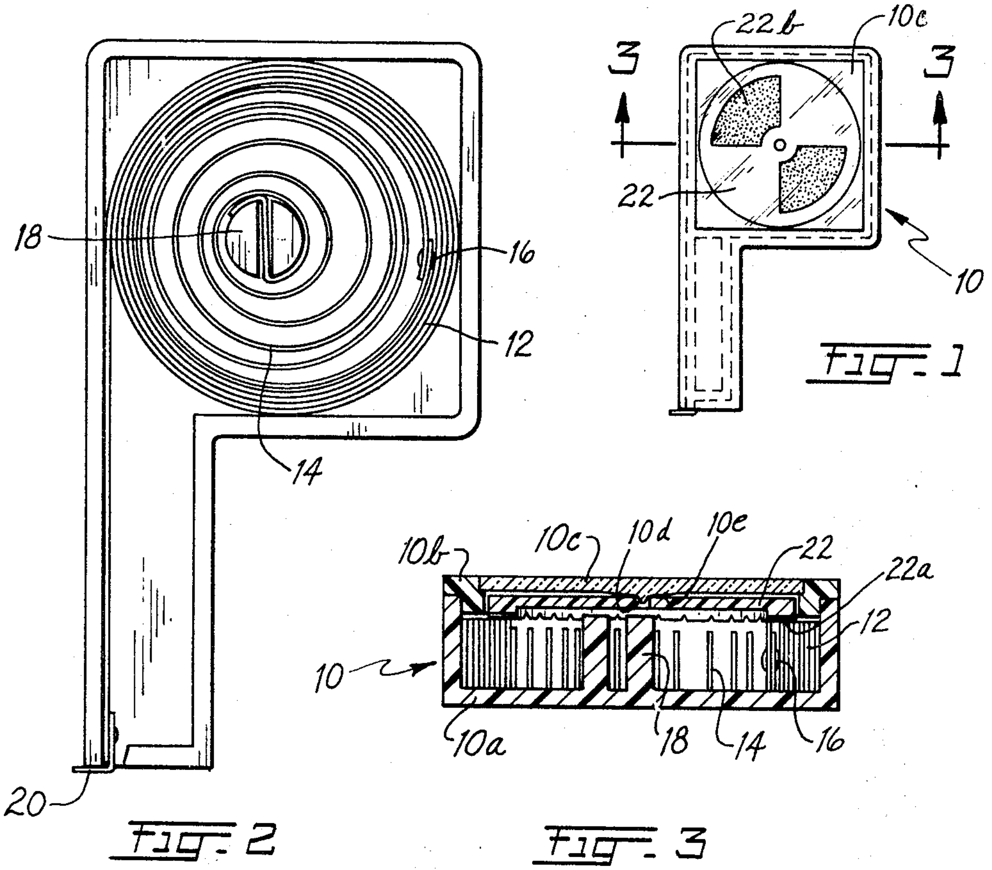
FIG. 1 is a front view of a presently preferred embodiment of the invention.
FIG. 2 is a front view of the embodiment of FIG. 1.
Figure 4:
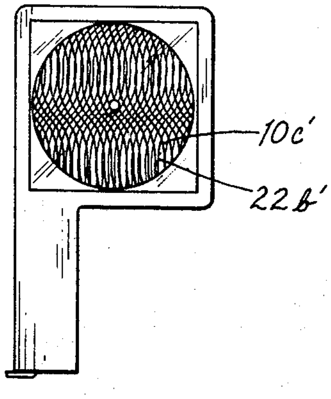
Figure 5:
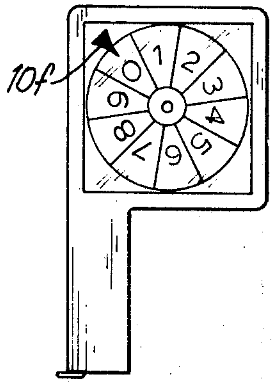

FIG. 3 is an enlarged cross-section of the embodiment in FIGS. 1 and 2 as viewed from the plane 3—3 in FIG. 1; and FIGS. 4 and 5 are front views corresponding to FIG. 1 of two modifications.

In FIGS. 1–3, a container 10 includes a base 10*a,* a cover 10*b* and a transparent wall 10*c*, each of molded plastic. A measuring tape 12 bearing markings of inches and feet is wound up within container 10. Advantageously, tape 12 is a metal strip that is bowed transversely so as to be stiff and straight when it is pulled out of the container and free of constraint. A wind-up spring 14 of leaf-spring stock has its outer end joined to the innermost end of measuring tape 10 by a rivet 16, while the inner end of spring 14 is formed with an S-band and secured in place by its fit in and about a slotted post 18 that is integral with the container. Tape 12 and spring 14 form a convoluted winding that is self-winding, having a hook 20 that insures access to the end of the tape so that it can be pulled out when needed, and to hook over corners of objects being measured.

A display disc 22 is disposed opposite a side of the composite winding 12–14. At its center disc 22 has a hole that receives a pivot 10*d,* and there is a slight rise 10*e* on the inside surface of wall 10*c* about pivot 10*d.* The pivot and the adjoining rise 10*e* are confined to the central portion of disc 22 and are the only portions of the container 10 that bear against disc 22. Disc 22 is clear of the container at its rim and at its top surface except at bearing area 10*e.*

Tape 12 is slightly wider than spring 14. Both the spring and the tape have their edges aligned at the inner surface of base 10*a,* so that the opposite edge of spring 14 is spaced from disc 22. Post 18 is off-center in container 10, at a place that promotes smooth rewinding of the tape and the post 18 is short and thus spaced out of contact with disc 22. Cover 10*b* overhangs the tape 12 and prevents it from lifting away from the inside wall of base 10*a* of the container. The lower face of disc 22 has a radially grooved annular projection 22*a* that bears lightly and frictionally against tape 12.

A pattern, design or inscription 22*b* is carried by disc 22. When hook 20 is pulled to extend a needed length of measuring tape, the friction of annular portion 22*a* of the disc against the edge of the wound tape induces rotation of the disc. When the tape is released to be rewound into the container, disc 22 spins in the opposite direction. The animated effect is pleasing to many users, lending special appeal to the device.

The appeal can be enhanced by providing both the transparent wall and the disc with complementary designs, as in FIG. 4 where two wavy patterns 10*c′* and 22*b′* are applied to the transparent wall 10*c* and to the disc 22, respectively. In that case, the changing moire pattern produced during the spinning of disc 22 and following successive returns of the tape into the container have a special fascination for many people.

FIG. 5 shows a still further modification, where numerals 0 through 9 on disc 22 move relative to an index mark 10*f* on transparent wall 10*c* of the container. The light frictional drive of disc 22 produced by the tape, and the tendency of the disc to spin beyond the moment when the tape is first fully rewound, cause the index 10*f* to point at various numbers on disc 22, as a random effect and useful as a wheel of fortune in games of chance.

Further variations can be devised by those skilled in the art, and therefore the invention should be broadly construed in accordance with its full spirit and scope.

What is claimed is:

1. A measuring tape unit, including a container, a measuring tape and a wind-up spring having respective ends secured to each other and forming a convoluted winding tensioned by the spring to be self-winding and normally retracted into the container, said tape forming the outer portion of the convoluted winding and having an end portion extending outside of the container for manual engagement, the innermost end of the spring being secured to said casing, said container having a side wall opposite a side of the convoluted winding, a display disc rotatably supported in said container between said side wall and said side of said convoluted winding, at least the preponderant part of the area of said side wall opposite said disc being transparent, said measuring tape unit including drive coupling means between said display disc and part of said convoluted winding for causing rotation of the disc when the extending length of the tape changes and rotates said part of the convoluted winding, the display disc bearing artwork providing animated effects as the disc rotates and the artwork is displayed through the transparent area of said side wall.

2. A measuring tape unit in accordance with claim 1, wherein said drive coupling means consists of lateral parts of said convoluted winding and said disc in mutual driving cooperation.

3. A measuring tape unit in accordance with claim 1, wherein said disc and said convoluted winding have mutually engaging lateral parts constituting said drive coupling means.

4. A measuring tape unit in accordance with claim 1, wherein said drive coupling means consists of relatively movable frictionally engageable lateral portions of said convoluted winding and said disc.

5. A measuring tape unit in accordance with claim 1, wherein said drive means comprises portions of said disc and said convoluted winding in suitably loose lateral frictional cooperation for accommodating continued spinning of the disc after the convoluted winding has been retracted into the container and has come to rest.

6. A measuring tape unit in accordance with claim 1, wherein said transparent area of said side wall has artwork overlying said disc contributing to the animated effects produced during spinning of the disc.

7. A measuring tape unit in accordance with claim 6 wherein said container has markings adjacent to said disc for providing random relationships of the markings of the container and the artwork of the disc when the latter has come to rest, said drive coupling means being adapted to cause overrunning drive of the disc by the convoluted winding.

8. A measuring tape unit in accordance with claim 1, wherein said display disc and said convoluted winding have mutually engaging portions confined to outer convolutions of the winding.

9. A measuring tape unit in accordance with claim 1, wherein said display disc and said convoluted winding have mutually engaging portions confined to outer convolutions of the winding, and wherein the disc and said side wall have mutually engaging bearing portions confined to a region close to the center of the disc for maintaining the disc out of contact with the container elsewhere.

10. A measuring tape unit in accordance with claim 1, wherein said display disc and said convoluted winding have mutually engaging portions confined to outer convolutions of the winding, said transparent wall and said disc having complementary artwork that assume changing relationships due to the rotation of the disc upon operation of the tape.

11. A measuring tape unit in accordance with claim 1, wherein said disc has an annular projection engaging a side of said convoluted winding adjacent the periphery thereof and the disc and the convoluted winding being mutually out of contact elsewhere, and wherein said disc and said container have cooperating lateral and pivotal bearing portions only at the central portion of the disc.

12. A measuring tape in accordance with claim 1 wherein part of said container overhangs the outermost convolutions of said winding about said disc for preventing the winding from pressing the disc firmly against the transparent wall and thereby avoiding rotation-inhibiting bearing friction.

References Cited

UNITED STATES PATENTS

| | | | |
|---|---|---|---|
| 55,327 | 6/1866 | McManus | 33—139 |
| 1,926,581 | 9/1933 | Clarke | 33—138 X |
| 1,942,006 | 1/1934 | Shikaly | 46—59 |
| 3,114,515 | 12/1963 | Kane | 33—138 X |
| 3,145,994 | 8/1964 | Ruderian | 273—142 |

EUGENE R. CAPOZIO, Primary Examiner

W. H. GRIEB, Assistant Examiner

U.S. Cl. X.R.

33—138; 46—59; 273—142